Patented Feb. 11, 1930

1,747,072

UNITED STATES PATENT OFFICE

EINAR HAEHRE, OF OSLO, NORWAY, ASSIGNOR TO THOMAS ROBERTS AND COMPANY, A FIRM CONSISTING OF THOMAS ROBERTS AND RAYMOND THEOBALD HARTMANN, OF LONDON, ENGLAND

SILVER EXTRACTION

No Drawing. Application filed February 15, 1928, Serial No. 254,629, and in Norway September 19, 1927

The present invention relates to a process for extracting silver from its ores which contain native silver.

Silver is generally extracted from its ores containing native silver by mechanical treatment for coarse grade ores or by a cyanide process for sand or slime ores. In the cyanide process the native silver is first dissolved in sodium or potassium cyanide this being effected in large vats with sand ores or in Pachuca tanks with slime ores. Then the liquid is filtered away and the residue is precipitated with sodium sulphide to form a dusty powder of silver sulphide, which is then extracted in filter presses. Further treatment of the silver sulphide involves losses owing to the fineness of the powder. This cyanide process is expensive to operate and requires expensive plant, and moreover the yield is not very high being in a normal case about 75%.

Experiments have shown that ores containing native silver are normally unsuitable for the known flotation process.

According to the present invention ores containing native silver are treated in the presence of steam with a substance or substances capable of reacting with silver to form silver sulphide in order to render such ores suitable for the flotation process.

The silver may be treated according to this invention to such an extent that it is wholly converted into silver sulphide or it may be treated to such an extent that grains of silver are merely coated with the sulphide.

In carrying this invention into practical effect ore containing native silver in a finely comminuted condition is treated with sodium potassium or ammonium sulphide to coat the grains of silver with a film of silver sulphide, the material being treated with steam to facilitate the reaction. These coated grains are then easily floated, and the resulting concentrate which is comparatively coarse grained is smelted to obtain the silver.

Instead of the alkali sulphides mentioned above the following substances are suitable for treating the ore:—hydrosulphuric acid, sulphites, native sulphur with water, polysulphides. The most suitable of these reagents in practice are however alkali sulphides and hydrosulphuric acid.

What I claim is:—

1. A process for treating the ores of silver which contain native silver, consisting of first subjecting the ore to the action of a sulphide producing reagent for silver in the presence of steam and then subjecting it to a flotation process.

2. A process for treating the ores of silver which contain native silver, consisting of first treating the ore with an alkali sulphide and steam and then subjecting it to a flotation process.

In testimony whereof I have signed my name to this specification.

EINAR HAEHRE.